Figure 1:
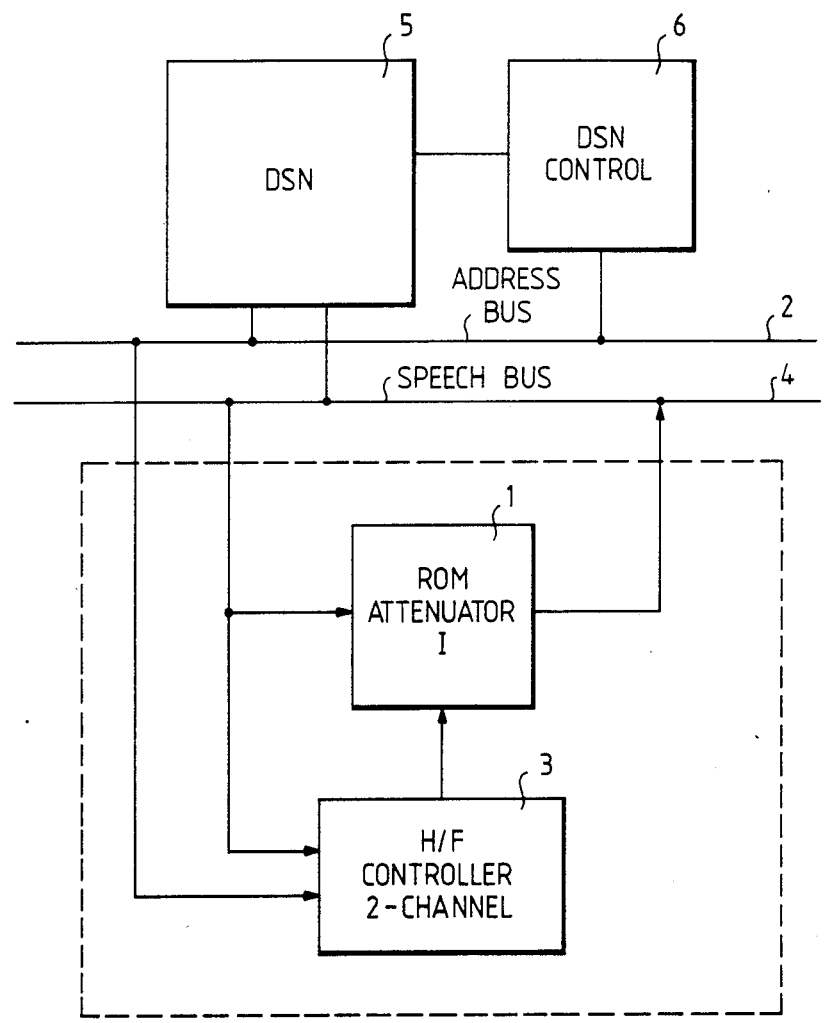

United States Patent [19]
Hansen

[11] Patent Number: 4,564,939
[45] Date of Patent: Jan. 14, 1986

[54] HANDSFREE TELEPHONE

[75] Inventor: Bjorn N. Hansen, Haverhill, England

[73] Assignee: International Standard Electric Corporation, New York, N.Y.

[21] Appl. No.: 589,611

[22] Filed: Mar. 14, 1984

[30] Foreign Application Priority Data

Mar. 15, 1983 [GB] United Kingdom ............... 8307143

[51] Int. Cl.$^4$ .......................................... H04J 3/02
[52] U.S. Cl. .................................. 370/85; 179/81 B
[58] Field of Search .......................... 370/62, 85, 67; 179/81 B

[56] References Cited

U.S. PATENT DOCUMENTS

| 3,976,847 | 8/1976 | Bidlack et al. | 179/81 B |
| 4,063,047 | 12/1977 | Huryn | 179/81 B |
| 4,161,624 | 7/1979 | Brosow | 179/81 B |
| 4,276,639 | 6/1981 | Fukuda et al. | 370/62 |
| 4,459,434 | 7/1984 | Benning et al. | 179/81 B |

Primary Examiner—Douglas W. Olms
Attorney, Agent, or Firm—John T. O'Halloran; Jeffrey P. Morris

[57] ABSTRACT

In a handsfree telephone system of the type described in our application No. 584,579, filed in the U.S. on Feb. 29, 1984, the method used to avoid howling due to feedback from the loudspeaker to the microphone is to increase the attenuation to speech in the quiescent direction as compared with that in the active direction. This involves monitoring successive speech samples in the two directions with each sample compared with a preset threshold, which also takes account of the system's noise levels. This is effected under processor control, as in the adjustment of the attenuation, since the system uses digital speech transmission.

It has now been found that it is not necessary to monitor all speech samples to derive adequate information about the occupancy conditions of the two speech directions. In the present systems only one speech sample in four is used. This enables one microprocessor to serve two lines alternately. Although this increases the amount of measuring used this costs less than the microprocessor which has been saved.

2 Claims, 2 Drawing Figures

HANDSFREE TELEPHONE

The present invention relates to digital telephones having the handsfree facility.

In systems in which such telephones are used, the speech transmission is digital, and the telephones are interconnected via a digital switching network (DSN). Since operation of the system is digital with processor control, as described in our application No. 584,578 filed in the U.S. on Feb. 29, 1984, control of the handsfree facility also uses digital techniques as described in our application No. 584,579, filed in U.S. on Feb. 29, 1984.

In a hands-free system it is necessary to ensure that acoustic coupling between the transducers (microphone and loudspeaker) does not cause the system to howl. To do this it is necessary to control the signal gains in the two speech paths, to ensure that the total loop gain is always less than unity. This is done by attenuating signals in the incoming speech path when outgoing signals are present, and vice-versa, under the control of a speech signal amplitude detection system.

In the system of our application No. 584,579, filed in U.S. on Feb. 29, 1984, we have described such a system in which the incoming speech sample signal is detected, and the amplitude thereof is compared with a set threshold. When this threshold is exceeded there is an initial delay before the speech path is switched on, and at the end of the speech signal there is a delay before switch off. The final delay should be minimised to avoid clipping and the second delay is to avoid unnecessary switching between words. In addition speech signals have to be detected in the presence of noise, so a noise detector is provided from which a noise parameter is derived and according to which the threshold level is set.

The arrangement referred to above is satisfactory, but we have now developed a more economical development of it.

According to the invention, there is provided an automatic telephone system, in which speech is conveyed digitally in time division multiplex manner and a handsfree facility is available for use by some at least of the subscribers served by the system, in which control of the handsfree facility in respect of a subscriber's terminal involves the monitoring of the speech signal condition for the two directions of transmission for that terminal, in which the attenuation in one or the other direction is increased in the direction wherein speech is not being conveyed as compared with the attenuation in the other direction, in which the speech condition in the two directions are assessed by monitoring speech samples present in those directions and on each monitoring comparing the monitoring result with a preset threshold, in which the monitoring, the comparisons and the adjustments to be made to the attenuations are effected under the control of a digital processor, in which the monitoring is effected on less than the full number of samples for each direction so that for each direction of transmission of speech samples only 1 out of N such samples are monitored, and in which a single said processor performs the said operations in respect of a plurality of speech channels having access to the handsfree facility, the processor serving the channels of said plurality singly and successively.

Figure 2:
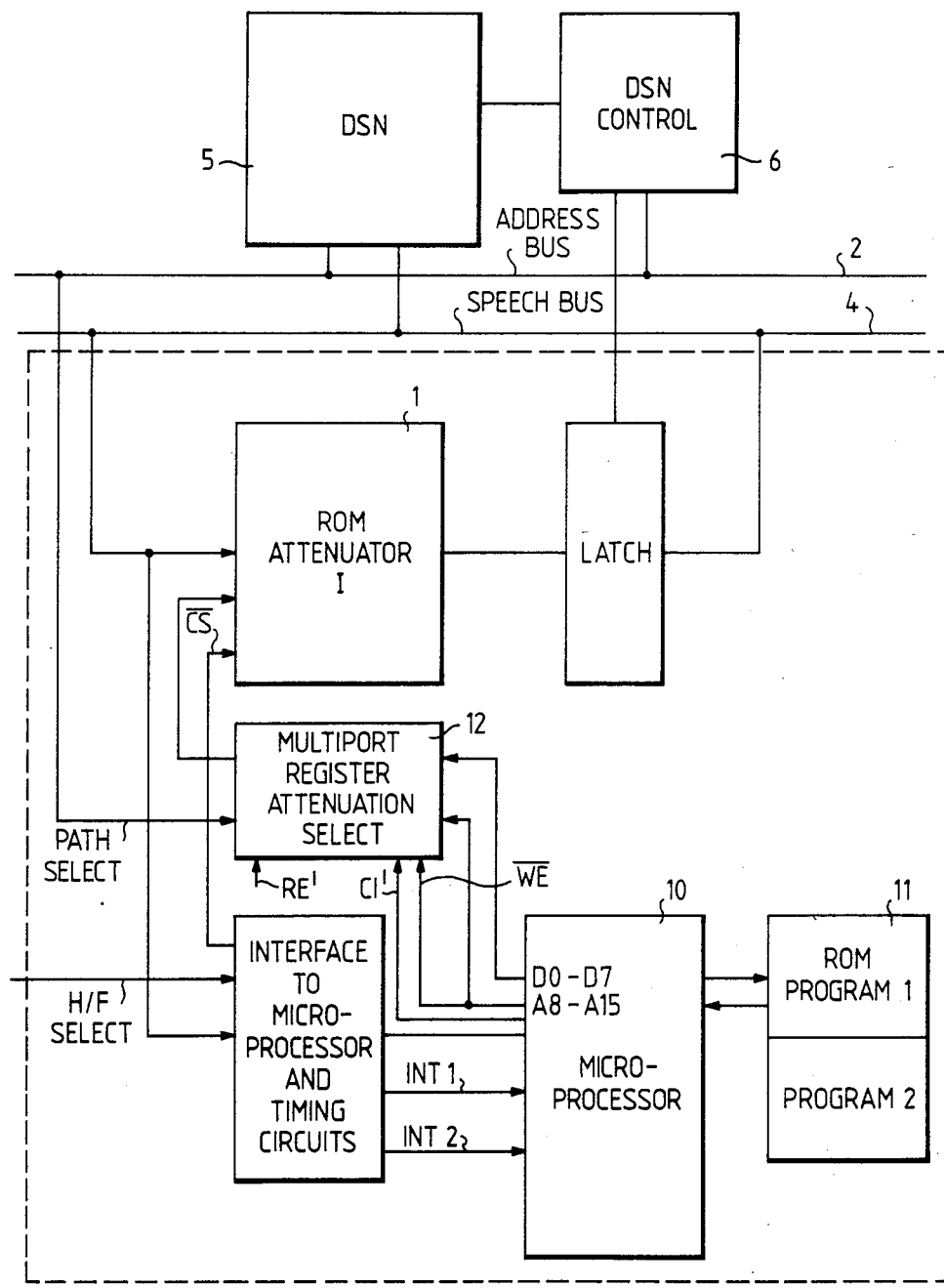

An embodiment of the invention will now be described with reference to the accompanying drawings, in which:

FIG. 1 is a schematic representation of a digital switching network with a two-channel handsfree facility;

and FIG. 2 shows an embodiment of the invention in which a single microprocessor controls the provision of handsfree facilities for two extensions of the network.

In the arrangement to be described, two handsfree control programs are run alternately by the same microprocessor, allowing two simultaneous handsfree conversations to take place. This halves the number of microprocessors needed at the cost of doubling the software memory requirements. However, additional ROM memory requirements of the size required, in this case up to 1K byte, cost considerably less than an additional microprocessor.

Software control of channel gains is carried out by continuously monitoring the speech samples from both directions and deriving from the results of these monitorings a parameter representation of the speech envelopes. The speech envelope parameters are, as in the arrangement of the aforementioned application Ser. No. 584,579 (B.N. Hansen 2), compared with set thresholds and the appropriate speech channel is enabled or partially disabled by controlling the attenuation of the speech paths.

We have found that the derivation of the parameter representation of the speech envelope does not require every speech sample to be monitored, but that instead, in the arrangement to be described, every fourth samples gives sufficient information as to the current speech patterns in the channels. Hence sufficient processing time is available to allow adequate gain control of two handsfree channels simultaneously. In some systems with a handsfree facility the ratio of speech samples to be monitored may be other than four.

As shown in FIG. 1 the two-channel digital handsfree facility for one extension includes an attenuator for digital signals in the form of a Read Only Memory 1. The input code from the address bus 2 of the system provides the ROM address and the corresponding output is a code representing an attenuated version of the input. There is also a controller circuit 3 which includes the microprocessor and memory. These are connected to the speech bus 4 and address bus 2 of a communication system, e.g. digital keysystem, digital PABX etc., which contains a digital switching network (DSN) 5 and a DSN control unit 6. During a handsfree conversation digital codes representing speech amplitudes from caller A to called party B and vice versa are continuously fetched from memory locations in the DSN 5 addressed through the ROM attenuator 1 and written back into other memory locations in the DSN. Initially this occurs without interference from the microprocessor and each channel is attenuated by a nominal amount, i.e. the channel is in standby. In the meantime the controller circuit monitors every fourth transmit and receive sample from each channel and from this information it derives control parameters which set the amount of attenuation of each sample as it is addressed through the ROM attenuator 1. All further settings of the channel gains are now determined by the handsfree controller circuit according to algorithms placed in the controlling software programs.

FIG. 2 shows the two-channel handsfree gain control circuit in greater detail. The microprocessor 10 and the ROM program memory 11 are shown as two separate components, but the method is applicable when using a single-chip microcomputer or any other suitable data processing device under software control. The software consists basically of two identical, but independent, main programs each containing one sub-routine or interrupt routine. The speech path gain settings are determined by algorithms in the main programs. The interrupt routines monitor the current speech patterns prevailing in the two channels and pass this information to the main programs for further processing. The sampling rate of the speech channels is assumed to be I/T, and the program flow is interrupted every 2T sec. alternating between the two main programs by timing pulses originating from the interface circuit and applied to two interrupt inputs. INT1 and INT2 on the processor. The interrupt routines run at the beginning of each 2T sec. processing period. During execution of the interrupt routine, signal amplitude information from the two transmission directions of one speech channel is converted to an approximation of the speech envelope, the parameters of which are passed to the main program. Processing then continues in the first main program until expiry of the 2 T sec. period, during which time the speech envelope parameters are compared with set thresholds and the appropriate speech channel is enabled or partially disabled by information passed to the attenuation select registers. Processing of the first main program is interrupted at the end of the 2 T sec. period by a timing pulse on input INT2, after which interrupt routine 2 starts and monitors speech information in the two directions on the other channel. As before, this information is passed to the other main program for processing. This other main program continues execution at the address following the address at which it was interrupted by a timing pulse on INT1. Similarly for the first main program.

The results of the processings in the two main programs are four parameters, two from each program, which ar related to the attenuation levels needed for the two speech directions in each channel. These four parameters are stored in a temporary register unit, the attenuation select register 12, FIG. 2. The ROM attenuator memory area is divided into a given number of attenuation level areas. Within each attenuation area the nominal speech sample digital code has been converted to a corresponding code with the appropriate attenuation, e.g. the (A-law) PCM sample code 11001010 when subjected to 6 dB attenuation becomes 11011010. These new codes replace the incoming codes to the ROM attenuator 1, the output of which is a sequence of codes representing a speech pattern which is identical to the incoming speech pattern, but reduced in amplitude. In this respect the operation is similar to that of application Ser. No. 584,579 (B.N. Hansen 2).

The ROM attenuator 1 operates as follows. Incoming speech sample codes form part of the address of the replacement code. The remaining part of the address is supplied by the attenuation select register 12, which enable access to specific attenuation areas of the ROM attenuator 1. Correct correspondence between speech sample and associated attenuation code is ensured by the sample's address code supplied by the DSN and input as an address to the attenuation select register. The attenuated output code is latched and then written back into its appropriate register in the DSN by the DSN control unit.

As already indicated, the proportion of speech samples monitored may be other than one in four. Thus in systems of the delta modulation type, where the sampling rate is relatively high, it may be possible for the preparation of speech samples monitored to be reduced.

I claim:

1. A digital handsfree telephone subscriber terminal circuit for transmitting and receiving digital time division multiplex speech in a plurality of channels comprising:

means for monitoring the speech signal condition of transmited and received speech at said terminal;

means for increasing the attenuation in either the transmitted or received speech direction in response to an indication from said monitoring means that speech is not present in said direction;

means for comparing monitored speech signals in the received and transmitted directions with a preset threshold level; and digital processor means for causing said means for increasing the attenuation to adjust the attenuation, and including means for causing said monitoring means to monitor less than a full number of samples of said transmitted and received speech, such that only one out of N samples are monitored singly and successively for each of said plurality of speech channels.

2. A circuit as claimed in claim 1, in which N=4 and said processor serves two channels.

* * * * *